United States Patent
Warner

(10) Patent No.: US 6,583,425 B1
(45) Date of Patent: Jun. 24, 2003

(54) DOSIMETRY USING SILVER SALTS

(75) Inventor: Benjamin P. Warner, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/312,753

(22) Filed: May 13, 1999

Related U.S. Application Data

(60) Provisional application No. 60/095,705, filed on Aug. 7, 1998.

(51) Int. Cl.$^7$ ................................................. G01T 1/04
(52) U.S. Cl. .................................................... 250/472.1
(58) Field of Search ........................ 250/370.07, 472.1; 430/226, 505, 559, 495.1

(56) References Cited

U.S. PATENT DOCUMENTS

| | | | | |
|---|---|---|---|---|
| 3,691,380 A | | 9/1972 | Hübner et al. | 250/83 CD |
| 3,899,677 A | | 8/1975 | Hori et al. | 250/474 |
| 4,207,104 A | * | 6/1980 | Chapman et al. | 430/225 |
| 5,053,339 A | * | 10/1991 | Patel | 436/2 |
| 6,103,351 A | * | 8/2000 | Ram et al. | 428/195 |

OTHER PUBLICATIONS

W. H. Hallenbeck, "Radiation Protection," Lewis Publishers, Ann Arbor, MI, 1994, pp. 47, 48, 51, 52, 62–66.
Victoria McLane, Charles L. Dunford, and Philip F. Rose, "Neutron Cross Sections," National Nuclear Data Center, Brookhaven National Laboratory, Academic Press, Inc., Harcourt Brace Jovanovich, San Diego, 1988, vol. 2, pp. 387–392.
C. M. Davisson and R. D. Evans, "Gamma–Ray Absorption Coefficients," Reviews of Modern Physics, 1952, vol. 24, No. 2, pp. 79–107.
F. H. Attix, and W.C. Roesch, ed., "Radiation Dosimetry," Academic Press, 1966, vol. II, chapter 13, pp. 241–290.
F. H. Attix, and W. C. Roesch, ed., "Radiation Dosimetry," Academic Press, 1966, vol. II, Chapter 15, pp. 325–387.
F. H. Attix, and E. C. Tochilin, ed., "Radiation Dosimetry," 1966, Academic Press, vol. III, chapter 28, pp. 557–616.
T. H. James, "Kinetics of Development by the Ferrous Ethylenediaminetetraacetate Complex Ion," Photographic Science and Engineering, Sep.–Oct. 1960, vol. 4, No. 5, pp. 271 to 280.
T.H. James, editor, "The Theory of Photographic Process," The MacMillan Company, 1966, 3rd edition, chapter 13, pp. 278–311.
"Neutron Fluence, Neutron Spectra and Kerma," ICRU Report 13, International Commission on Radiation Units and Measurements, 4201 Connecticut Ave, NW, Washington, DC 20008, Sep. 15, 1969, pp. 6 and 10.
Richard W. Ramette, "Chemical Equilibrium and Analysis," Addison–Wesley Publishing Company, 1981, pp. 338–341 and 364.
Robert C. Weast, Melvin J. Astyle, and William H. Beyer, "CRC Handbook of Chemistry and Physics," CRC Press, Inc., Boca Raton, Florida, 1984, pp. D–151 to D–155.

* cited by examiner

*Primary Examiner*—Constantine Hannaher
*Assistant Examiner*—Otilia Gabor
(74) *Attorney, Agent, or Firm*—Samuel L. Borkowsky

(57) ABSTRACT

The present invention provides a method for detecting ionizing radiation. Exposure of silver salt AgX to ionizing radiation results in the partial reduction of the salt to a mixture of silver salt and silver metal. The mixture is further reduced by a reducing agent, which causes the production of acid (HX) and the oxidized form of the reducing agent (R). Detection of HX indicates that the silver salt has been exposed to ionizing radiation. The oxidized form of the reducing agent (R) may also be detected. The invention also includes dosimeters employing the above method for detecting ionizing radiation.

17 Claims, 2 Drawing Sheets

DOSIMETRY USING SILVER SALTS

This application is based on, and claims the priority of, U.S. Provisional Application No. 60/095,705 entitled "Dosimetry Using Silver Salts," which was filed on Aug. 7, 1998. The present invention relates generally to dosimetry and, more particularly, to methods and dosimeters that use silver salts for detecting a threshold dosage of ionizing radiation.

This invention was made with government support under Contract No. W-7405-ENG-36 awarded by the U.S. Department of Energy to The Regents of the University of California. The U.S. Government has certain rights in the invention.

FIELD OF THE INVENTION

Background of the Invention

It is important that workers who may be exposed to hazardous radiation be able determine whether they have been exposed, and their level of exposure, i.e. the radiation dosage. Situations may arise where workers must cease work at a particular worksite if they have been exposed to a radiation dosage that exceeds a predetermined value. Dosimetry relates to measuring a dosage of ionizing radiation, and a "dosimeter" is a portable radiation sensor that is used to determine whether a worker has been exposed to a particular dosage of radiation. Radiation impinging on the dosimeter produces physical and/or chemical changes in the dosimeter, and an analysis of the changes may provide the type and dosages of the radiation.

Dosimeters may be grouped into "non-real time" and "real-time" dosimeters. "Nonreal time" dosimeters do not provide the worker with an immediate determination of their particular radiation dosage. By contrast, "real time dosimeters" do provide the worker with an immediate determination of their radiation dosage. By determining immediately the radiation dosage, the worker may avoid additional unnecessary and prolonged exposure to radiation.

In general, dosimeters have a radiation-sensing element surrounded by a protective housing. The housing offers mechanical protection to the sensing element. Also, the housing may include materials that absorb various types of radiation to prevent these types of radiation from reaching the radiation-sensing element. For example, a thin housing made of paper can stop alpha radiation. A housing a few mm thick and made of plastic, aluminum, or cardboard can stop alpha and beta radiation, while a thinner plastic housing can stop alpha radiation but pass beta radiation. A 1-mm thick lead housing will attenuate a 150 KeV photon to 0.03 of its initial dose. A 2-mm thick lead housing will attenuate a 150 Kev photon to about 0.0001 of its initial dose. A 5-mm thick lead housing will attenuate the dose from a 250 KeV gamma or x-ray photon to 0.001 of the initial dose.

"Colorimetric dosimeters" are a general class of real time dosimeters that provide the user with a visible color change upon exposure to radiation. The appearance of a particular color may indicate that the radiation threshold for the dosimeter has been reached. Similarly, a range of colors, or of intensities of a particular color, may correspond to a range of dosages. A color chart may be provided with the dosimeter for color comparison to determine dosage. Alternatively, the dosimeter may be equipped with a mechanical meter that provides a numerical value of the dosage.

U.S. Pat. No. 3,691,380 entitled "Threshold Value Dosage Meter" by K. Hübner et al., which issued Sep. 12, 1972, describes a threshold value dosage meter for detecting 0.5–10 megarad dosages of ionizing radiation. An aqueous solution containing polyvinyl alcohol, methyl orange, chloral hydrate, and sodium tetraborate (borax) buffer is poured onto a support and dried to produce the threshold dosage meter. Irradiation of the dosage meter with ionizing radiation results in the ionization of the chloral hydrate and in the production of hydrogen chloride, which reacts with the methyl orange to produce a color change from yellow to red. The added buffer attenuates the threshold of the dosage meter by reacting with hydrogen chloride until the buffer is exhausted.

U.S. Pat. No. 3,899,677 entitled "Plastic for Indicating a Radiation Dose" by Y. Hori et al., which issued Aug. 12, 1975, describes a plastic film which undergoes a color change in response to a radiation dose. A solution of a chlorinated polymer, a plasticizer, and at least one acid sensitive coloring agent is flow coated onto a support and dried to produce the film. Irradiation of the film produces hydrogen chloride, which reacts with the coloring agent to produce a visible color change.

The G-value of a dosimeter is a measure of its sensitivity to radiation. The G-value is defined as the number of reactions produced per 100 eV of radiation deposited on the dosimeter. Useful colorimetric sensors often have a G-value of about 3, and are used to detect and measure relatively high, often megarad, dosages of radiation.

Dosimeters that employ silver as a radiation-sensing element are inherently very sensitive because silver has a high cross section for many types of radiation, including neutron and gamma radiation. Neutron cross sections for silver can be found in "Neutron Cross Sections," vol. 2, V. McLane, C. L. Dunford, and P. F. Rose, National Nuclear Data Center, Brookhaven National Laboratory, Academic Press, Inc., Harcourt Brace Jovanovich, San Diego, 1988. Gamma radiation absorption coefficients for silver can be found in "Gamma-Ray Absorption Coefficients," C. M. Davisson and R. D. Evans, *Reviews of Modern Physics*, vol. 24, p 79–107, 1952.

Both solid state and emulsion type dosimeters having silver as a radiation-sensing element are known. For example, a solid state, silver containing dosimeter is described in "Radiation Dosimetry", edited by F. H. Attix et al., Academic Press, (1966), vol. II, chapter 13, page 258. A block of silver-activated phosphate glass was placed into a plastic locket to form the "DT-60" personal dosimeter. A dosimeter employing a silver-based emulsion is described in "Radiation Dosimetry", vol. II, chapter 15, and vol. III, chapter 28. The emulsion contains microscopic silver halide crystals that are dispersed in gelatin and coated on a support to produce a film. Exposure of the film to radiation produces an image on the film. The image may be in the form of particle tracks that can be analyzed to yield detailed information regarding the identity and energy of the particles that produced the tracks. The following equations, which generally describe the chemistry of the well-known photographic process, summarize the chemistry involved when the film is exposed to radiation,:

$$(AgX)_n + \text{radiation} \rightarrow (AgX)_{n-m} Ag^0{}_m + (X_2)_{m/2} \qquad \text{(equation 1)}$$

$$(AgX)_{n-m} Ag^0{}_m + (RH)_{n-m} Ag_n{}^0 + (HX)_{n-m} + R_{n-m} \qquad \text{(equation 2)}$$

$$HX + B \rightarrow HBX \qquad \text{(equation 3)}$$

According to equation 1, radiation interacts with a grain of silver salt $(AgX)_n$, where X is typically bromide, chloride, iodide, or a mixture thereof, to produce an aggregate grain $((AgX)_{n-m}Ag^0{}_m)$ having both silver salt and silver metal $(Ag^0)$. The radiation of equation 1 may include non-ionizing radiation such as visible and ultraviolet radiation, and ionizing radiation such as alpha-, beta-, gamma-, x-ray-, neutron-, electron beam-, and proton beam radiation. According to equation 2, a photographic developer (RH), i.e. a reducing agent, rapidly reduces the aggregate grain to silver metal $(Ag^0)$; acid (HX) and an oxidation product (R) are also produced. According to equation 3, acid (HX) reacts with a base (B) to form an acid-base complex (HBX).

The pH of the silver containing emulsion changes during the developing process as HX is produced. The activity of some reducing agents may change as the pH changes, which may result in the production of underdeveloped or overdeveloped images. To avoid this, a buffer is added to the emulsion to maintain the activity of the developer. This facilitates the production of high quality images.

Dosimeters employing silver emulsions are extremely sensitive to radiation. They provide images from which the identity and energy of the radiation can be determined. However, dosimeters employing silver emulsions do not allow workers to immediately determine their radiation dosage.

Therefore, an object of the present invention is to provide a method for detecting ionizing radiation.

Another object of the present invention is to provide a silver-based calorimetric radiation dosimeter.

Yet another object of the present invention is to provide a threshold dosimeter which blocks non-ionizing radiation and detects ionizing radiation.

Still another object of the present invention is to provide a dosimeter that achieves the foregoing objects and also enables the user to immediately measure radiation dosages.

Additional objects, advantages, and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention as embodied and broadly described herein, the present invention includes a method for detecting ionizing radiation. The invention includes exposing at least one silver salt AgX, wherein X is chloride, bromide, or iodide, to ionizing radiation to produce a product having silver salt and silver metal. A reducing agent reduces the remaining silver salt in the product to silver metal, and acid is also produced and is detected.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

The present invention includes a method for detecting ionizing radiation and a dosimeter that uses this method. The dosimeter of the present invention combines the rapid response and general ease of use of calorimetric dosimeters with the high sensitivity of silver toward ionizing radiation. Workers using the present invention can immediately determine whether they have been exposed to a particular radiation dosage.

Figure 1:
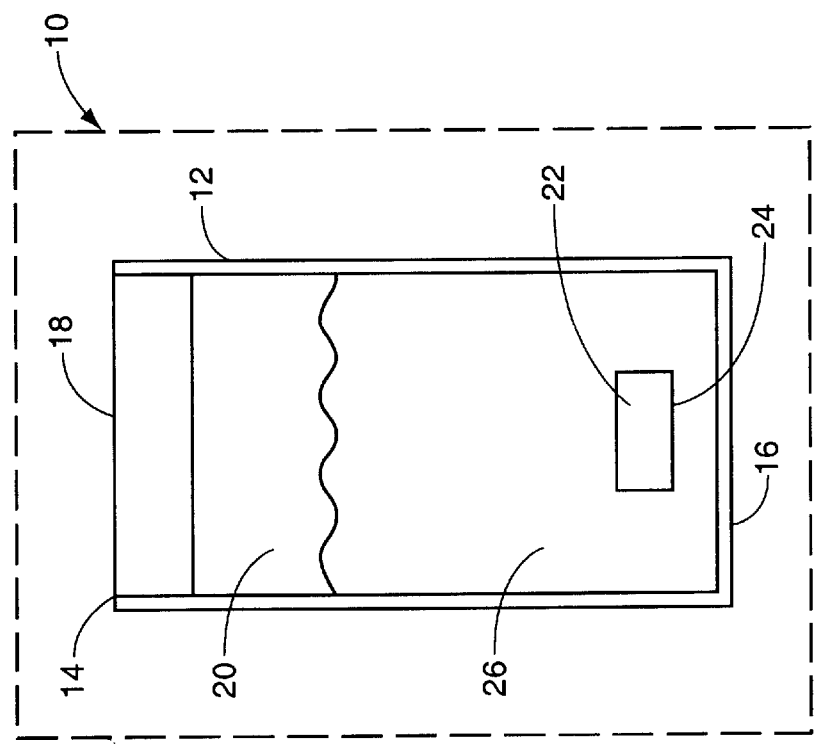
FIG. 1 is a cross-sectional side view of a dosimeter of the present invention.

FIG. 1 shows a cross-sectional side view of the dosimeter of the present invention. Dosimeter 10 includes a transparent housing 12 having an open end 14 and a closed end 16. Septum 18 seals open end 14 to provide an airtight chamber 20. Radiation-sensing element 22 is enclosed within porous opaque enclosing member 24. An aqueous solution 26 containing a dissolved reducing agent RH and pH indicator is located within chamber 20. An example of dosimeter 10 was fabricated in the following manner. Under a nitrogen atmosphere, an aqueous solution of the reducing agent $Fe(II)(H_2EDTA)$ and phenol red indicator was prepared by combining phenol red, an aqueous sulfuric acid solution of $FeSO_4$, and an aqueous solution of $H_4EDTA$ and lithium hydroxide (LiOH) until a faint pink color, indicating a solution slightly basic of the equivalence point, was observed. A radiation-sensing element in a porous enclosing member was prepared by coating a warm sample of Kodak™ Autoradiography Emulsion Type NTB-2 onto a flexible piece of polyvinyl chloride support. This emulsion contains silver bromide with an average grain size of about 0.26 microns. The supported emulsion was cooled to harden the emulsion, wrapped into a bundle with sufficient black nylon fabric to shield the emulsion from light but allow fluid communication with aqueous solution in contact with the bundle. The bundle was secured with additional PVC to prevent it from unraveling. Other plastics that do not absorb or release hydrogen ions, such as polyethylene, polypropylene, polystyrene, polyamides, and polyesters, may also be used. The bundle was placed into a housing, cooled to maintain the hardened emulsion, capped with a septum to provide an air-tight chamber in the housing, and purged with nitrogen gas to remove air. The aqueous solution was added via hypodermic syringe to the chamber through the septum to provide the dosimeter. When the dosimeter was subjected to a dosage of ionizing gamma and/or neutron radiation above the dosimeter threshold, the solution color changed from pink to yellow. Exposure of the dosimeter to an ionizing radiation dosage less than the threshold dosage may provide a colorless solution or a range of intensities of color resulting from the production of a quantity of HX insufficient to combine with the entire amount of pH indicator.

Figure 2:
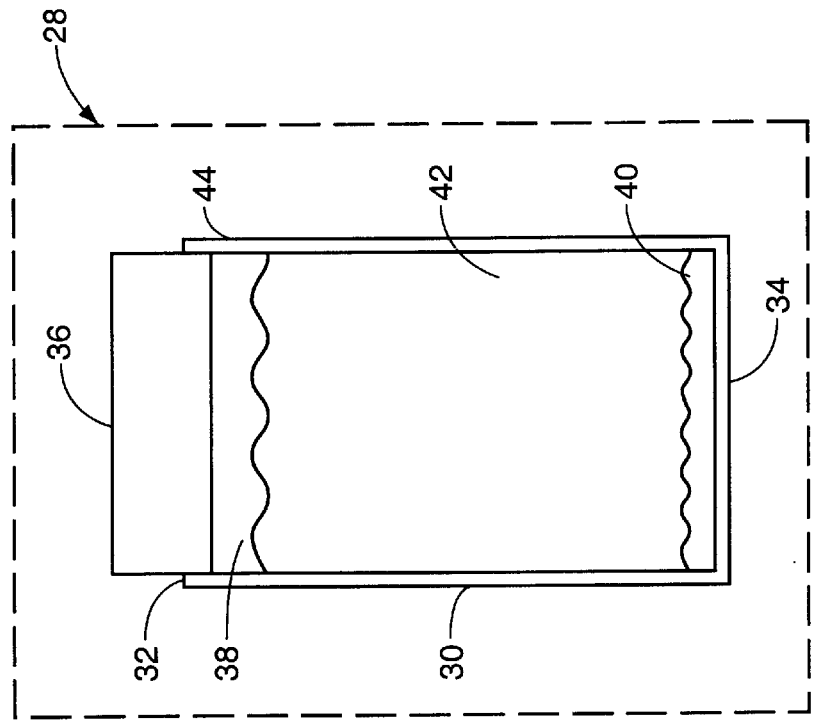
FIG. 2 is a cross-sectional side view of a second embodiment of the dosimeter of the present invention.

A cross-sectional side view of a second embodiment of the present invention is shown in FIG. 2. Dosimeter 28 has a housing 30 having an open end 32, a closed end 34, and a pierceable septum 36 that seals open end 32 to provide airtight chamber 38. Dosimeter 28 includes radiation sensing element 40, and aqueous solution 42 that includes a reducing agent and a pH indicator. Housing 30 is opaque, or is provided with an opaque outer cover 44 to prevent light from reaching and reacting with radiation sensing element 40. An example of dosimeter 28 was constructed in a darkroom under a number 2 light filter in the following manner. A warm sample of Kodak™ Autoradiography Emulsion Type NTB-3, containing silver bromide with an average grain size of about 0.34 microns, was placed into a transparent housing. The housing/emulsion was cooled to harden the emulsion and sealed with a septum to provide an airtight chamber. The housing was covered with black tape to prevent light from reacting with the silver bromide in the emulsion. The chamber was purged with nitrogen to remove air. An aqueous solution of phenol red and Fe(II)(H$_2$EDTA), prepared as previously described, was added to the chamber via syringe through the septum to produce the dosimeter. After exposing the dosimeter to ionizing radiation, a portion of the solution was removed. The solution color had changed from pink to yellow, indicating that the radiation threshold had been reached or exceeded.

In the absence of ionizing radiation, Fe(II)(H$_2$EDTA) reacts with the silver halide in the emulsion to produce a solution color change in about 8 hours. Therefore, this dosimeter example had a service lifetime of about 8 hours after construction. The service lifetime can be extended by dissolving various materials into the solution that increase the viscosity of the solution. The service lifetime can also be extended by employing other reducing agents that react more slowly with the silver halide in the absence of ionizing radiation.

Figure 3:
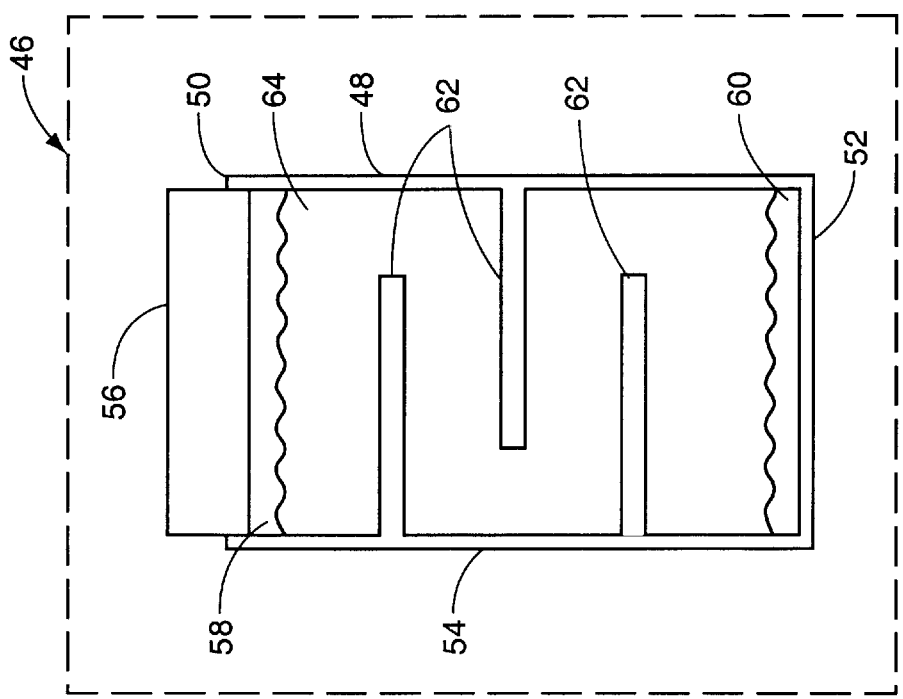
FIG. 3 is a cross-sectional side view of a third embodiment of the dosimeter of the present invention.

A cross-sectional view of a third embodiment of the present invention is shown in FIG. 3. Dosimeter 46 includes housing 48 having an open first end 50 and a closed second end 52. Housing 48 is opaque or is provided with an opaque cover 54. Transparent sealing member 56 forms a seal with first end 50 to provide an airtight chamber 58 within dosimeter 46 and is transparent to allow viewing within the chamber. Dosimeter 46 is provided with a radiation-sensing element 60 that is shielded from direct light by opaque baffles 62 within housing 48. Aqueous solution 64 inside housing 48 includes a reducing agent and a pH indicator and may be viewed through sealing member 56.

Figure 4:
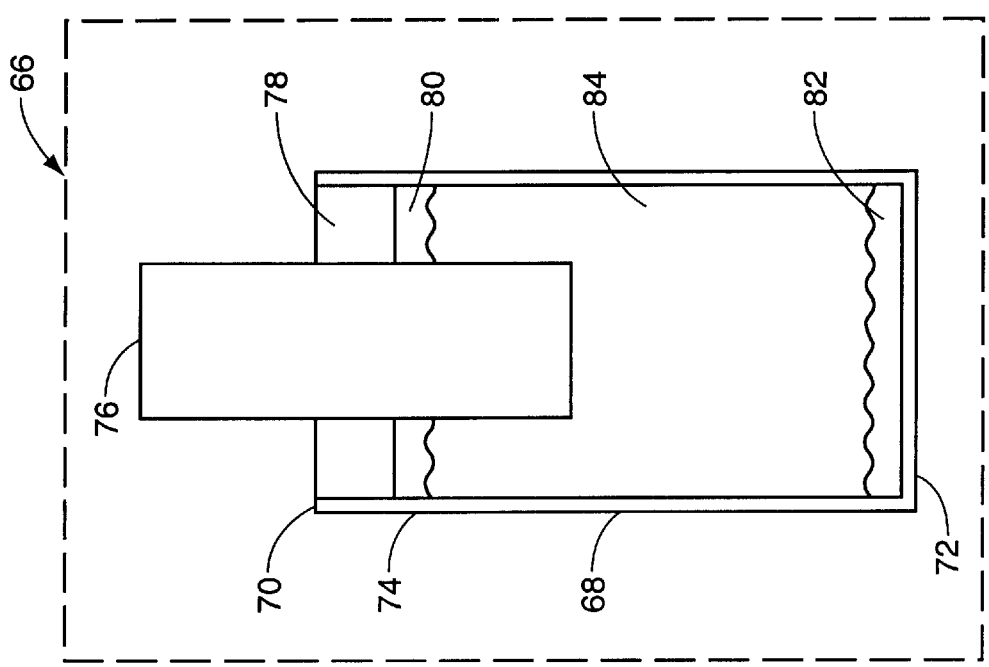
FIG. 4 is a cross-sectional side view of a fourth embodiment of the dosimeter of the present invention.

A cross-sectional view of a fourth embodiment of the present invention is shown in FIG. 4. Dosimeter 66 includes housing 68 having an open end 70 and a closed end 72. Housing 68 is opaque, or is provided with an outer opaque cover 74. Dosimeter 66 also includes a pH-sensing element 76, such as a pH electrode. Septum 78 forms a seal between open end 70 and pH sensing element 76 to provide an airtight chamber 80 in housing 68. Dosimeter 66 also includes radiation-sensing element 82, and an aqueous solution 84 having a reducing agent. A pH indicator, such as phenol red, is optionally added to solution 84. The pH of solution 84 can be measured by connecting the pH-sensing element 76 to a pH meter, not shown. The pH of solution 84 can also be measured by removing a portion of solution 84 and inspecting the color of the solution if a pH indicator has been added to the solution.

Ionizing radiation that passes through the dosimeter of the present invention may interact with the silver halide in the dosimeter and begin sequence of reactions that is summarized by equations 4–6 below.

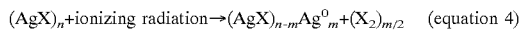
$(AgX)_n + \text{ionizing radiation} \rightarrow (AgX)_{n-m}Ag^0{}_m + (X_2)_{m/2}$ (equation 4)

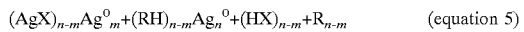
$(AgX)_{n-m}Ag^0{}_m + (RH)_{n-m}Ag_n{}^0 + (HX)_{n-m} + R_{n-m}$ (equation 5)

$HX + Ind \rightarrow HIndX$ (equation 6)

According to equation 4, ionizing radiation reacts with silver halide $(AgX)_n$ to produce the aggregate product $(AgX)_{n-m}Ag^0{}_m$, which includes both silver halide and silver metal. According to equation 5, the $(AgX)_{n-m}Ag^0{}_m$ produced in equation 4 reacts with reducing agent RH to produce silver metal Ag(0), the oxidized product (R), and acid (HX). According to equation 6, the HX produced in equation 5 reacts with a pH indicator (Ind) to produce the indicator complex (HIndX), which is accompanied by a visually detectable color change. In practice, reducing agent (RH) is chosen such that it selectively reacts with aggregate species $(AgX)_{n-m}Ag^0{}_m$ rather than with $(AgX)_n$.

Silver halide $(AgX)_n$ used with the present invention includes silver chloride, silver bromide, silver iodide, or mixtures thereof. The silver halide may be provided in an emulsion. However, emulsions are not required for practicing the present invention. The silver halide may take the form of granules. Granule particle sizes of about 0.26–1 microns have been used in the present invention. Other sized granules, or even a large single crystal of silver halide may also be used.

A preferred reducing agent of present invention is Fe(II)(H$_2$EDTA), where EDTA is ethylenediaminetetraacetate, because it shows little change in activity over a wide pH range from about pH 3–10, as stated in "Kinetics of Development by the Ferrous Ethylenediaminetetraacetate Complex Ion" by T. H. James in Photographic Science and Engineering, vol. 4, no. 5, September-October 1960, p 271. Another preferred reducing agent is Fe(II)(H$_2$EGTA), where EGTA is ethyleneglycol-bis(2-aminoethylether)-N,N,N',N'-tetraacetate. Fe(II)(H$_2$EGTA) provides certain advantages when compared to Fe(II)(H$_2$EDTA). For example, in contrast to Fe(II)(H$_2$EDTA), Fe(II)(H$_2$EGTA) does not buffer and attenuate the response of the solution to radiation. Also, Fe(II)(H$_2$EGTA) provides the present invention with a longer service lifetime (about 20 h) as compared to Fe(II)(H$_2$EbTA) (about 8 h).

Other reducing agents that can be used with the present invention include classical reducing agents for the photographic process, which are described in "The Theory of Photographic Process," $3^{rd}$ edition, edited by T. H. James, The Macmillan Company, 1966, chapter 13. These include inorganic reducing agents containing metals of variable valence such as ferrous oxalate and other iron(II) complexes. They also include titanium(III) complexes, chromium(II) complexes, and vanadium(II) complexes. They also include classical organic reducing agents such as hydroquinone, catechol, p-amino-phenol, p-phenylenediamine, metol, ascorbic acid, and inorganic non-metallic developing agents such as hydrogen peroxide and hydroxylamine. The pH of a dosimeter may be adjusted for a particular reducing agent prior to use. For example, some reducing agents such as hydroquinone become inactive at a low pH.

The service lifetime of the present invention may also be extended by dissolving a material in the solution to increase the viscosity of the solution. Materials used to increase the viscosity of the solution include polyvinyl alcohol (PVA), methylcellulose, gelatin, or other similar materials. A preferred aqueous solution contains about 3–10 w/w % of PVA. Solutions containing a higher weight % of PVA are more difficult to manipulate, and solutions containing a lower % of PVA do not provide a significant enhancement to the service lifetime. For example, the service lifetime of the dosimeter employing Fe(II)(H$_2$EDTA) as the reducing agent can be extended from 8 hours to about 16 hours by including about 5.2 w/w % of PVA.

The present invention may include reducing agents that act as indicators themselves. When oxidized, they produce a detectable color change in the absence of a pH indicator. For example, a dosimeter of the present invention may include Ti(III)(HEGTA), an intensely colored reducing agent that provides a color change from purple to colorless when the dosimeter is exposed to ionizing radiation. Ti(III)(HEGTA) may be prepared by combining a degassed solution of H$_4$EGTA and lithium hydroxide with a degassed acidic titanium (III) chloride solution. A degassed solution of a pH indicator, such as aniline, blue or bromocresol purple, could then be added. Although the additional pH indicators are not required when Ti(III)(HEGTA) or other similar colored reducing agents that act both as reducing agent and indicators are employed, they may be included to enhance the color change upon exposure to radiation by reacting with the acid generated. Polyvinyl alcohol may be optionally included, as previously described, to extend the service lifetime of the dosimeter.

Bronstead bases that are capable of binding to at least one hydrogen ion may be used as pH indicators of the present invention. Commonly, the acid form of the indicator is one color while the basic form of the indicator is a different color. Also, one form may be colorless and the other may be colored. Indicators of present invention include phenol red, bromothymol blue, aniline blue, and pHydrion™ vivid 1–11 one-drop indicator solution. Aniline blue indicator produces an obvious and easily recognizable color change from yellow to blue. Preferred indicators provide a distinct and easily recognized endpoint between a pH of about 6–8. Clearly, many other reducing agents and pH indicators can be used to provide an embodiment of the present invention.

The present invention does not require a buffer. However, small amounts of a buffer may be used to attenuate the radiation threshold of the present invention. The initial acid (HX) produced combines with the added buffer until the buffer is exhausted. The additional acid combines with the indicator to produce a color change.

In contrast to film badges, the dosimeter of the present invention can measure the total dosage of radiation received. The threshold dosage required for the color change may depend the size of the silver halide granules, the area of the emulsion, the concentration of the pH indicator, and other factors. Generally, the radiation threshold of a dosimeter can be lowered by increasing the size of the silver halide granules and by increasing the surface area covered by the silver halide. Providing a concentration of indicator sufficient to buffer the aqueous solution may increase the radiation threshold of the dosimeter.

Often, it is not necessary to provide, or distinguish between, the of types of radiation detected by the dosimeter, as when the type or types of radiation are already known. More importantly, it may be desired to know only the total radiation dosage. For example, workers in the nuclear industry may need to know if they have been exposed to a given total dose of x-ray-, neutron-, and gamma- radiation but not how much of each in particular.

Obvious modifications of the present invention include the enhancement, attenuation, or elimination of the dosimeter response to specific types of radiation. For example, the dosimeter housing can be modified to absorb a specific type or types of radiation but allow another type or types to pass through and react with the silver salt inside the dosimeter chamber. To detect neutron radiation in the presence of gamma radiation, a dosimeter may be provided with a lead-containing or lead coated housing.

The present invention can also be sensitized to a particular type of radiation. For example, materials can be included that emit a type of radiation that interacts more effectively with the silver halide upon absorption of another type of radiation that interacts less effectively with the silver halide. For example, the response of the dosimeter to neutrons can be enhanced if the housing includes, or is coated with, polyethylene, polypropylene, graphite, or other materials that enhance the flux of thermal neutrons through the dosimeter. The response of the dosimeter to thermal neutrons can also be enhanced by including with the silver halide, chemical compounds having $^6$Li, $^{10}$B, $^{157}$Cd, or $^{155,157}$Gd. For example, silver halide can be mixed with lithium hydroxide ($^6$LiOH), lithium chloride ($^6$LiCl), cadmium chloride ($^{157}$CdCl$_2$), or other similar compounds. The following equations summarize how $^6$Li, $^{10}$B, $^{157}$Cd, and $^{155,157}$Gd interact with thermal neutrons to produce alpha and gamma radiation:

$$^6\text{Li} + \text{neutron} \rightarrow \text{alpha} + {}^3\text{H} \qquad \text{(equation 7)}$$

$$^{10}\text{B} + \text{neutron} \rightarrow \text{alpha} + {}^7\text{Li} \qquad \text{(equation 8)}$$

$$^{113}\text{Cd} + \text{neutron} \rightarrow \text{gamma} + {}^{114}\text{Cd} \qquad \text{(equation 9)}$$

$$^{155,157}\text{Gd} + \text{neutron} \rightarrow \text{gamma} + {}^{156,158}\text{Gd} \qquad \text{(equation 10)}$$

The alpha- and gamma-radiation produced interacts more effectively with the silver halide than the thermal neutrons do.

EXAMPLES

One liter of a degassed 0.030M Fe(II)(H$_2$EDTA) solution having phenol red indicator was prepared. The phenol red indicator can be prepared as an aqueous solution, or adsorbed to a solid inert carrier. Mallinckrodt IndicatAR™ pH 7–8 (0.059 g) having 0.1% phenol red indicator adsorbed onto sodium chloride was used to prepare the solution for the dosimeters below. The faint pink color of the solution indicated that it was just basic of the equivalence point. This solution was used in the preparation of the dosimeters that follow.

Preparation of a radiation dosimeter. A dosimeter was prepared in a dark room using a number 2 light filter. Operations were performed under nitrogen where needed to minimize exposure to the air. Black nylon fabric was rinsed with deionized water and dried. Kodak Autoradiography Emulsion Type NTB-2 (composed of 70–75% water, 16% silver bromide having a grain size of 0.26 μm, 5–10% gelatin, 1–5% glycerin and <1% n-propanol) was warmed to about 40° C. About 0.200 ml of the warmed emulsion was placed onto a small piece of flexible polyvinylchloride plastic and cooled to room temperature to harden the emulsion. The black nylon fabric was wrapped around the emulsion-coated plastic and tied down with thin strips of polyvinylchloride. The assembly was placed in a 16-ml vial, and the vial was capped with a rubber septum and refrigerated to harden the emulsion. After flushing the capped vial with nitrogen, about 5 ml of the Fe(II)(H$_2$EDTA) solution was added to the vial via syringe to produce the dosimeter. The dosimeter was irradiated with about p1.5 Rad of gamma rays from a 5 mCi Cs-137 source. The solution color changed from pink to colorless, indicating that the methyl red indicator was about half-protonated.

Preparation of a second radiation dosimeter. The dosimeter was prepared in a dark room using a number 2 light filter. Operations were performed under nitrogen where needed to minimize exposure to the air. The silver halide source used was Kodak Autoradiography Emulsion Type NTB-3 composed of 70–75% water, 16% silver bromide having a grain size of 0.34 μm, 5–10% gelatin, 1–5% glycerin and <1% n-propanol. The emulsion was liquified by heating it to about 40° C. About 0.300 ml of the warmed emulsion was placed into a glass vial having a volume of about 12 ml. The vial was capped with a rubber septum, covered with black tape, and refrigerated to provide a hardened disk-shaped emulsion having a surface area of about 2.27 cm$^2$ at the base of the vial. About 5 ml of the Fe(II)(H$_2$EDTA) solution was added via syringe to produce the dosimeter. The dosimeter was exposed to a gamma radiation source. When the dosimeter was exposed to about 38 millirem, the solution remained pink. When the total exposure reached 51 millirem, the solution had changed from pink to yellow.

When the dosimeter, prepared as described above, was exposed to 13-millirad of beta radiation from a Sr-90 beta-radiation source, the solution color remained pink. After exposure to an additional 14 millirad of beta radiaton, the solution color changed from pink to yellow.

Another dosimeter was prepared with about 0.200 ml of the Kodak™ NTB-3 emulsion and was exposed to a $^{241}$Am—Be neutron source encased in a stainless steel cylinder inside a polyethylene container. After about three hours of exposure, the solution color changed from pink to yellow. Although the neutron source also emitted 1.6 millirem per hour of gamma radiation at the location of the dosimeter, an identical dosimeter required about 1.1 Rem of just gamma radiation from a gamma radiation source to produce the same color change. Therefore, the color change was mostly due to neutron exposure, and not to gamma exposure.

Increasing the viscosity of the aqueous solution of the present invention. About 0.90 liter of an aqueous, degassed solution containing aniline blue indicator and about 0.015–0.030M Fe(II)(H$_2$EGTA) was prepared. The solution had a faint yellow color, indicating a solution pH slightly higher than the equivalence point of the indicator. The solution was added to about 40 g of de-oxygenated polyvinyl alcohol (PVA). The resulting mixture was heated in a boiling water bath for about an hour to homogenize the developer with the PVA. If the faint yellow color fades or if a faint blue color appears, a base such as LiOH can be added until the yellow color reappears. The resulting more viscous aqueous solution can be used to provide radiation dosimeters of the present invention.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for detecting ionizing radiation, comprising:
   (a) preparing a mixture of a solid phase and a liquid phase, the solid phase comprising at least one silver salt AgX wherein X is selected from the group consisting of chloride, bromide, and iodide, the liquid phase comprising an aqueous solution of a reducing agent and a pH indicator that produces a color change in the range of about pH 3–10;
   (b) exposing the mixture to ionizing radiation, whereby at least some of the silver salt is reduced to silver metal and at least some of the reducing agent is oxidized into at least one soluble oxidized product and acid that produces a color change with the pH indicator;
   (c) removing at least a portion of the liquid phase from the mixture; and
   (d) detecting the color change.

2. The method for detecting ionizing radiation of claim 1, wherein the pH indicator is selected from the group consisting of phenol red, bromothymol blue, aniline blue, and pHydrion™ vivid 1–11 one-drop indicator solution.

3. The method for detecting radiation of claim 1, wherein said reducing agent is selected from the group consisting of Fe(II)(H$_2$EDTA), Ti(III)(HEDTA) or Ti(III)(HEGTA).

4. The method for detecting ionizing radiation of claim 3, further including the step of dissolving a material into the liquid phase to increase the viscosity of the liquid phase prior to exposure to ionizing radiation.

5. The method for detecting ionizing radiation of claim 4, wherein the material that increases the viscosity of the liquid phase is selected from the group consisting of polyvinyl alcohol, methylcellulose, and gelatin.

6. A dosimeter for detecting ionizing radiation, comprising:
   (a) a porous opaque container;
   (b) a solid phase inside said porous container and a liquid phase, the solid phase comprising at least one silver salt AgX wherein X is selected from the group consisting of chloride, bromide, and iodide, the liquid phase comprising an aqueous solution of a reducing agent and a pH indicator that produces a color change in the range of about pH 3–10, the reducing agent releasing acid into the liquid phase upon exposure of the silver salt to ionizing radiation;
   (c) a transparent housing for receiving said porous container and said liquid phase, said housing having an open end and a closed end; and
   (d) means for sealing the open end of said housing to provide an air-tight chamber therein.

7. The dosimeter of claim 6, wherein said pH indicator is selected from the group consisting of phenol red, bromothymol blue, aniline blue, and pHydrion™ vivid 1–11 one-drop indicator solution.

8. The dosimeter of claim 6, wherein said reducing agent is selected from the group consisting of Fe(II)(H$_2$EDTA), Ti(III)(HEDTA) or Ti(III)(HEGTA).

9. The dosimeter of claim 8, wherein said liquid phase further comprises a material that increases the viscosity of said liquid phase.

10. The dosimeter of claim 9, wherein said viscosity increasing material is selected from the group consisting of polyvinyl alcohol, methylcellulose, and gelatin.

11. The dosimeter of claim 6, wherein said at least one silver salt comprises an emulsion.

12. A dosimeter for detecting ionizing radiation, comprising:
   (a) an opaque housing having an open end and a closed end;
   (b) a pierceable sealing member for sealing the open end of said housing to provide an air-tight chamber therein; and
   (c) a mixture of a solid phase and a liquid phase inside said housing, the solid phase comprising at least one silver salt AgX wherein X is selected from the group consisting of chloride, bromide, and iodide, the liquid phase comprising an aqueous solution of a reducing agent and a pH indicator that produces a color change in the range of about pH 3–10, the reducing agent releasing acid into the liquid phase upon exposure of the silver salt to ionizing radiation.

13. The dosimeter of claim 12, wherein said pH indicator is selected from the group consisting of phenol red, bromothymol blue, aniline blue, and pHydrion™ vivid 1–11 one-drop indicator solution.

14. The dosimeter of claim 12, wherein said reducing agent is selected from the group consisting of Fe(II)(H$_2$EDTA), Ti(III)(HEDTA) or Ti(III)(HEGTA).

15. The dosimeter of claim 14, wherein said liquid phase further comprises a material that provides said liquid phase with an enhanced viscosity.

16. The dosimeter of claim 15, wherein the viscosity enhancing material is selected from the group consisting of polyvinyl alcohol, methylcellulose, and gelatin.

17. The dosimeter of claim 12, wherein said at least one silver salt comprises an emulsion.

* * * * *